(12) United States Patent
Higgins et al.

(10) Patent No.: US 11,240,007 B1
(45) Date of Patent: Feb. 1, 2022

(54) USING SECURE ENCLAVES FOR DECRYPTION IN UNSECURED LOCATIONS

(71) Applicant: Amazon Technologies, Inc., Seattle, WA (US)

(72) Inventors: Daniel Higgins, Seattle, WA (US); Willard Charles Stanley, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 563 days.

(21) Appl. No.: 16/103,698

(22) Filed: Aug. 14, 2018

(51) Int. Cl.
*H04L 9/06* (2006.01)
*H04L 9/08* (2006.01)
*H04L 29/06* (2006.01)
*H04L 9/32* (2006.01)

(52) U.S. Cl.
CPC .......... *H04L 9/0827* (2013.01); *H04L 9/3268* (2013.01); *H04L 63/0442* (2013.01); *H04L 63/061* (2013.01); *H04L 63/166* (2013.01)

(58) Field of Classification Search
CPC ... H04L 9/0827; H04L 63/166; H04L 9/3268; H04L 63/0442; H04L 63/061; H04L 9/0819; H04L 63/062
USPC .......................................................... 713/151
See application file for complete search history.

(56) References Cited

U.S. PATENT DOCUMENTS

| | | | | |
|---|---|---|---|---|
| 5,802,178 A | * | 9/1998 | Holden | H04L 63/0218 713/151 |
| 9,438,568 B2 | * | 9/2016 | Andoni | H04L 63/0428 |
| 9,887,975 B1 | * | 2/2018 | Gifford | H04L 63/126 |
| 10,826,690 B2 | * | 11/2020 | Zhang | H04L 9/0825 |
| 2010/0318800 A1 | * | 12/2010 | Simon | H04L 9/0866 713/171 |
| 2015/0365427 A1 | * | 12/2015 | Ben-Shalom | H04L 63/1441 726/23 |
| 2016/0373418 A1 | * | 12/2016 | Stahl | H04W 12/04 |
| 2016/0380985 A1 | * | 12/2016 | Chhabra | H04L 63/0876 713/171 |
| 2017/0223529 A1 | * | 8/2017 | Schafer | H04L 9/0822 |
| 2017/0353319 A1 | * | 12/2017 | Scarlata | H04L 9/14 |
| 2018/0167203 A1 | * | 6/2018 | Belenko | H04L 9/14 |
| 2018/0205711 A1 | * | 7/2018 | Kumar | G06F 21/602 |
| 2019/0149527 A1 | * | 5/2019 | John | H04L 9/3247 713/171 |

* cited by examiner

*Primary Examiner* — Farid Homayounmehr
*Assistant Examiner* — Sanchit K Sarker
(74) *Attorney, Agent, or Firm* — Eversheds Sutherland (US) LLP

(57) ABSTRACT

Systems, methods, and computer-readable media are disclosed for systems and methods for using secure enclaves for decryption in unsecured locations. Example methods may include receiving, by a webserver, an encrypted session key from a device, where the encrypted session key is encrypted using a public key associated with the webserver, sending the encrypted session key to a key server for decryption, where the key server is configured to decrypt the encrypted session key in a secure enclave, determining, by the key server, a decrypted session key using a private key, where private key data for a number of private keys is stored at the secure enclave, receiving a decrypted session key from the key server, where the decrypted session key is the encrypted session key in decrypted form, and establishing a secure session with the device using the decrypted session key.

17 Claims, 6 Drawing Sheets

USING SECURE ENCLAVES FOR DECRYPTION IN UNSECURED LOCATIONS

BACKGROUND

Device authentication, such as during initiation of a secured communication session, may use encryption keys to protect communicated data. In some instances, access to authentication credentials, such as encryption or decryption keys, may be secured not only digitally, but with physical security as well. For example, computer systems at which encryption or decryption keys are stored may be under continuous video surveillance, protected behind cages, locked in facilities, and so forth. However, physical security may not always be available, or may not be practical in all instances. Accordingly, protection of authentication credentials in unsecured locations may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
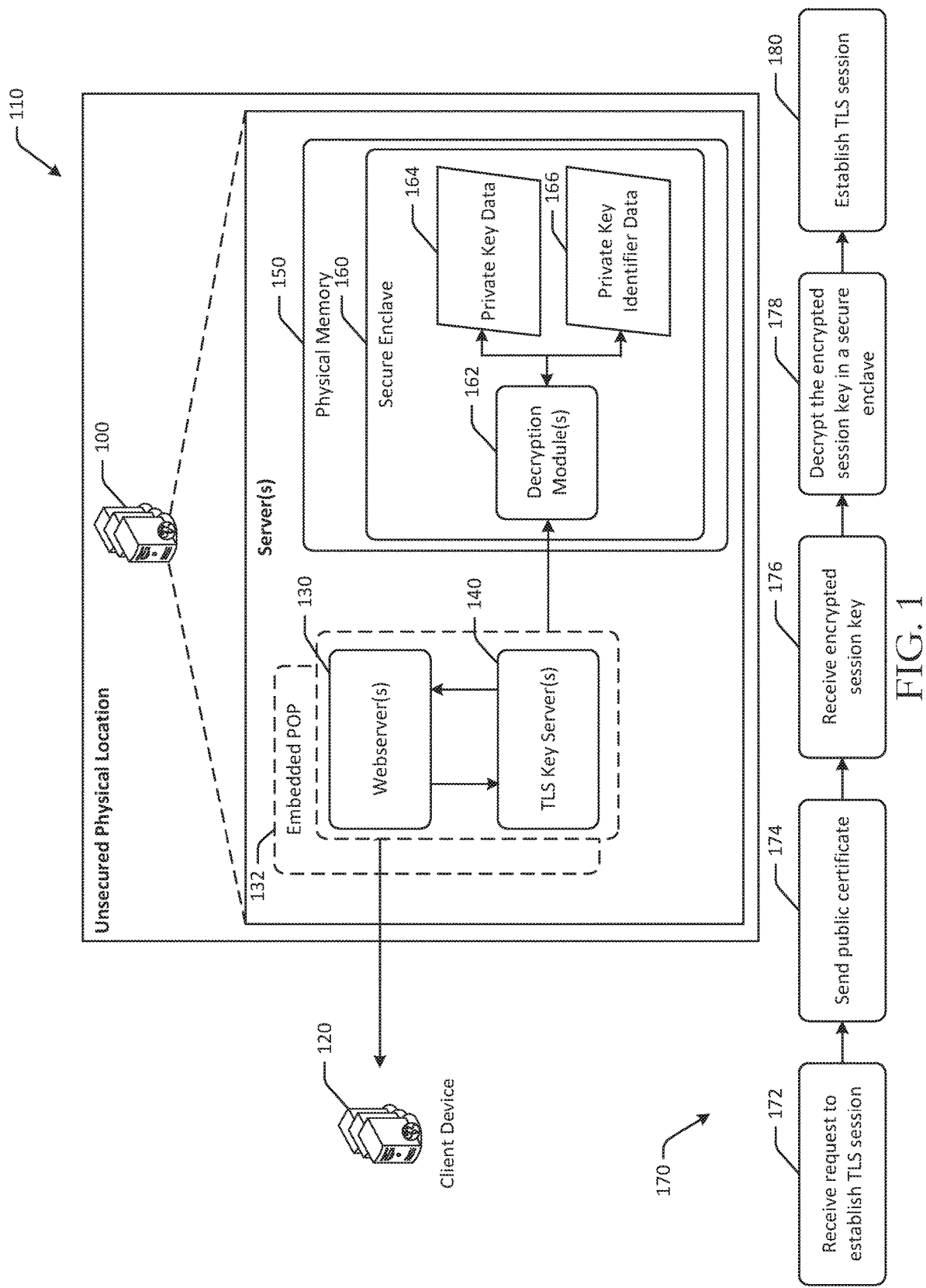
FIG. 1 is a schematic illustration of an example use case for using secure enclaves for decryption in unsecured locations in accordance with one or more example embodiments of the disclosure.

Electronic communications and data, such as browser or other application data, email communications, messaging data, and other electronic communications and data, may be sent from one device to another over a network. Data associated with such communications may be encrypted and/or sent during a secure session between the devices, so as to prevent or reduce a likelihood of unauthorized access to the data. To establish a secure session and/or to encrypt data, a number of cybersecurity protocols may be used. In one example, a secure session may be established using a Transport Layer Security (TLS) protocol with keys generated using Rivest-Shamir-Adleman techniques. Another example includes TLS with keys generated using Elliptical Curve Cryptography. TLS, as well as its predecessor Secure Sockets Layer protocol, may be a cryptographic protocol used to secure communications over a computer network. Data sent using TLS may be encrypted using a session key that is known by the sending device, such as a client device, and by the receiving device, such as a server. The session key may be generated by the client device and sent to the server, in one example, or may be generated by the server and sent to the client device, in another example. During the secure session, the session key may be used to encrypt and decrypt communications between the respective devices.

To establish a secure session using a security protocol such as TLS, a handshake or other protocol may be used. For example, a client device may request to establish a secure session with a server. The server may be associated with a private key and a public key that may be used to secure communications from a device to the server. Specifically, a sending device may send data to the server that is encrypted using the server's public key, and the data may be decrypted by the server using the server's private key. Without the private key, the data may not be decrypted. The public key may be a cryptographic key that can be obtained and used by any device to encrypt messages intended for a particular recipient, such as the server, such that the encrypted messages can be deciphered only by using a second key that is known only to the recipient, which is the private key.

The private key may therefore not be shared with other devices. In addition, protection and security of the private key may be important, so as to avoid unauthorized decryption of data intended for the server or device with which the private key is associated. Accordingly, servers or computer systems at which private key data (e.g., private keys, key identifiers, etc.) is stored may be secured in secure facilities, under video surveillance, in locked cages, etc. Unauthorized access to such computer systems may therefore be difficult. However, such physical security may not always be available.

Embodiments of the disclosure include systems and methods for using secure enclaves for decryption in unsecured locations. Certain embodiments may include computer systems that have webservers and key servers, where the key servers include a secure enclave that is used to store private key data, and in which decryption of data is performed. Secure enclave data and processes executed within the secure enclave may be hidden from other components of the key server, as well as remote computer systems, and may be prevented from being accessed even in the event the key server itself is compromised. In one example, a secure enclave may be formed using INTEL® Software Guard Extensions, which may provide a protected area of execution in memory hardware, as described herein. Using the secure enclave at the key server, authentication between devices, such as during a TLS handshake protocol, may be completed while maintaining security of private key data, even in unsecure physical locations.

This disclosure relates to, among other things, devices, systems, methods, computer-readable media, techniques, and methodologies for using secure enclaves for decryption in unsecured locations. Certain embodiments use secure enclaves to run a secured key server and/or key server cache that protects certain data, such as private key data, in the event of compromised security. Certain embodiments may separate handshake protocol operations and/or decryption operations into separate services and/or computer systems, thereby maintaining security while reducing latency. Some embodiments may include private key data stored in cache memory, while other embodiments may include private key data stored in secured databases. In some embodiments, key servers may be remote and a computer host or webserver may never have custody of a private key. Some embodiments may include a secure enclave and may serve as a local private key cache. Latency penalty and availability risk may be reduced. In the event of a cache miss, a private key fetch from a region/key server may be triggered.

Referring to FIG. 1, an example use case for using secure enclaves for decryption in unsecured locations is depicted in accordance with one or more example embodiments of the disclosure. In FIG. 1, one or more server(s) 100 may be located in an unsecured physical location 110. For example, the server 100 may be located in an unlocked cabinet and/or may not be under human or video surveillance. The server 100 may include one or more webservers 130, one or more TLS key servers 140, and physical memory 150. The webserver 130 may be a device or application configured to serve web page or other data to devices. In an example, the webserver 130 and/or the server 100 may be configured as an embedded host. The TLS key server 140 may be a device or application configured to receive and/or decrypt data using cryptographic keys. The TLS key server 140 may be on the same network as the webserver 130 in some embodiments. The physical memory 150 may be any suitable memory device, as described with respect to FIG. 6. The server 100 may optionally be located at an access point or internet service provider facility and may include or be in communication with one or more embedded point of presences (POPs) 132. A POP may be infrastructure that is configured to allow remote users to connect to the internet, and may include one or more routers, switches, servers, and/or other data communication devices. In embodiments where the embedded POP 132 is available, certain server certificates (e.g., the most frequently used and/or popular, etc.) may be stored in cache memory at the embedded POP 132, thereby reducing memory usage at the embedded host, and may reduce communications to one round trip for certificates that are stored at the embedded POP. Some embodiments may or may not include embedded POPs.

Popular Certificates at the Embedded POP which Will Save Us Memory on the Embed Hosts A secure enclave 160 may be executed and/or formed on the physical memory 150 and optionally one or more processors. In some embodiments, the secure enclave 160 may include memory and one or more processors. The secure enclave 160 may be executed on one or more dedicated processors, and/or may share one or more processors or portions of processors with other computing systems. The secure enclave 160 may be executed using a set of central processing unit instruction codes to allocate private regions of memory that are protected from processes running at higher privilege levels. The secure enclave 160 may be isolated from a main processor(s) to provide an extra layer of security. The secure enclave 160 may be, in some embodiments, a protected area in an application's address space, which may provide confidentiality and integrity even in the presence of privileged malware. Accesses to the enclave memory area from any software not resident in the enclave may be prevented. The secure enclave 160 may be protected even if the BIOS, VMM, operating system, and/or drivers of a computer system are compromised. In some embodiments, the secure enclave 160 may be associated with a dedicated computer processor(s), such as a secure enclave processor that is dedicated to processing for the secure enclave, in addition to the protected region of memory.

The secure enclave 160 may include one or more applications, such as one or more decryption modules 162, and data, such as private key data 164 and private key identifier data 166. The decryption module 162 may be configured to receive calls or requests, such as a request to decrypt data, and may execute one or more processes within the secure enclave 160, determine a result within the secure enclave 160, and return the result. Other components may not have insight to or be able to view processes executed within the secure enclave 160. The decryption module 162 may include a call gate that restricts entry to and exit from the decryption application.

The private key data 164 may include private keys for one or more servers, such as the webserver 130. The private key identifier data 166 may include key identifiers that may be associated with respective private keys in the private key data 164, and may be used by the decryption module 162 for decrypting and/or encryption of data.

To store private keys in the private key data 164, a private key may be encrypted using a public key, such as the public key for the secure enclave 160, and the encrypted private key, or the private key that is encrypted using the public key, may be sent to the secure enclave for storage in the private key data 164.

A client device 120 may request to establish a secure session with the server 100 and/or the webserver 130. To decrypt data using a secure enclave, an example process flow 170 is presented and may be performed, for example, by the server 100. The server 100 may include at least one memory that stores computer-executable instructions and at least one processor configured to access the at least one memory and execute the computer-executable instructions to perform various actions or operations, such as one or more of the operations in the process flow 170 of FIG. 1.

At block 172, a request to establish a TLS session may be received. For example, the webserver 130 at the server 100 may receive a request from the client device 120 to establish a TLS session or a secure session. The webserver 130 may receive a client hello message indicative of a request to initiate a secure session using TLS. The client hello message may include or be associated with a first random value and a cipher suite, which may be a set of key exchange encryption algorithms supported by the client device. A cipher suite may be a set of symmetric and asymmetric encryption algorithms that can be used by hosts to establish a secure communication. Supported cipher suites can be classified based on encryption algorithm strength, key length, key exchange and authentication mechanisms. Example algorithms that cipher suites can include are: a key exchange algorithm, a bulk encryption algorithm, and/or a message authentication code (MAC) algorithm.

The webserver 130 may send to the client device 120 one or more of: (i) a server hello message comprising a second random value, and/or (ii) a server digital certificate for authentication of the webserver 130 by the client device 120. The server digital certificate may include a server public key for the webserver 130.

At block 174, a public certificate may be sent to the client device 120. For example, the webserver 130 may send a public certificate associated with the webserver 130 to the client device 120. The public certificate may be used by the client device 120 to authenticate the webserver 130. The public certificate may include a public key associated with the webserver 130 that can be used to encrypt data sent to the webserver 130. In some instances, the public key may be sent to the client device 120 separate from the public certificate.

At block 176, an encrypted session key may be received. For example, the client device 120 may encrypt a session key using the public key associated with the webserver 130. The client device 120 may send the encrypted session key to the webserver 130. The webserver 130 may receive the encrypted session key. A session key may be a short-lived cryptographic key that may be negotiated by the client device 120 and the webserver 130 based on a shared secret. A session key's lifespan may be bounded by the session to which it is associated. The session key may be used for subsequent secure communication with the client device 120 during a secure session.

At block 178, the encrypted session key may be decrypted in a secure enclave. For example, the webserver 130 may receive the encrypted session key (and optionally a key identifier) from the client device 120, and may send the encrypted session key and key identifier to the TLS key server 140 for decryption. The TLS key server 140 may decrypt the encrypted session key using the decryption module 162. For example, the encrypted session key may be sent to the decryption module 162. The decryption module 162 may receive the encrypted session key and may transition execution from an untrusted portion of the decryption application or module to the secure enclave 160. In the secure enclave 160, the decryption application or module may determine a private key associated with the key identifier using the private key data 164 and the private key identifier data 166. The decryption application or module may determine the decrypted session key using a trusted decryption function and the private key. In some embodiments, the webserver 130 and the key server 140 may be physically separated, and the encrypted session key may be received by the webserver 130 from the client device 120, along with a key identifier or other metadata associated with the server public key or private key for decryption by the key server 140. The decryption module 162 may be configured to operate in a protected area of execution in memory 150, and the secure enclave 160 may be inaccessible by an operating system of the key server 140.

The decryption module 162 may output a decrypted session key, which may be used for encryption and decryption of communication between the webserver 130 and the client device 120. The decryption module 462 may optionally store the private key in the cached private key data 464 and the corresponding key identifier in the cached private key identifier data 466 for subsequent use.

At block 180, a TLS session may be established. For example, the webserver 130 may send a confirmation message to the client device 120 indicating that subsequent communication will be encrypted using the session key. In another example, the webserver 130 may send to the client device 120, a confirmation message indicating that the decrypted session key will be used for subsequent communication. A secure session may thus be established between the webserver 130 and the client device 120.

Embodiments of the disclosure may include systems and methods to decrypt data, such as session identifiers, using secure enclaves, and may include one or more modules that can be used to access secure enclaves. Some embodiments may include discrete servers and/or computer systems for decryption, so as to provide additional flexibility with respect to unsecured physical locations.

Example embodiments of the disclosure provide a number of technical features or technical effects. For example, in accordance with example embodiments of the disclosure, certain embodiments of the disclosure may automatically decrypt data, such as session identifiers, using a secured enclave at a key server. Embodiments of the disclosure may provide security regardless of whether a webserver (and in some instances, a key server) is in a physically secured location. As a result of improved functionality, latency in authentication protocols, such as TLS handshakes, may be reduced, thereby improving functionality of computer systems. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
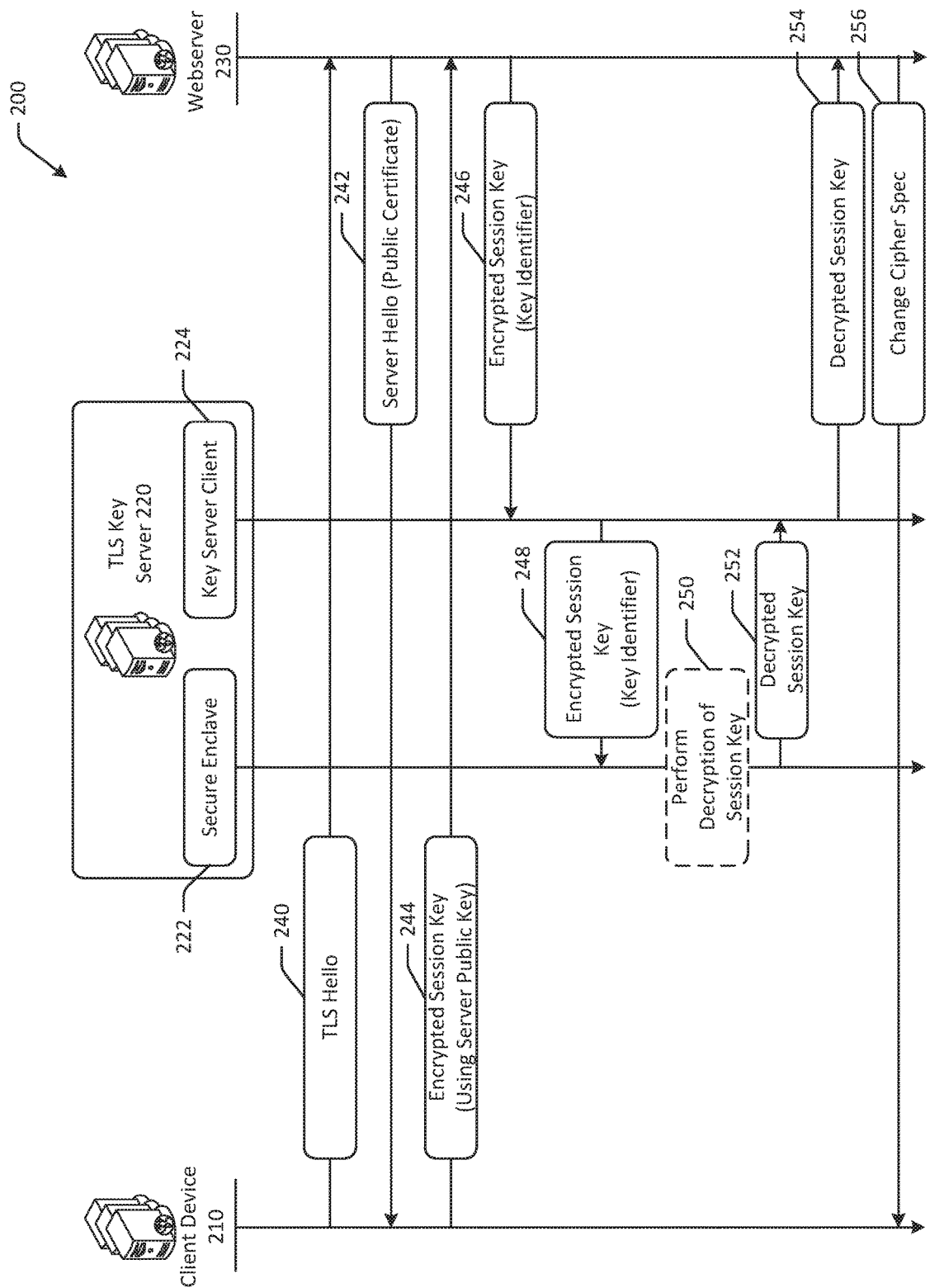
FIG. 2 is a schematic illustration of an example data and operation flow for using secure enclaves for decryption in unsecured locations in accordance with one or more example embodiments of the disclosure.
Figure 3:
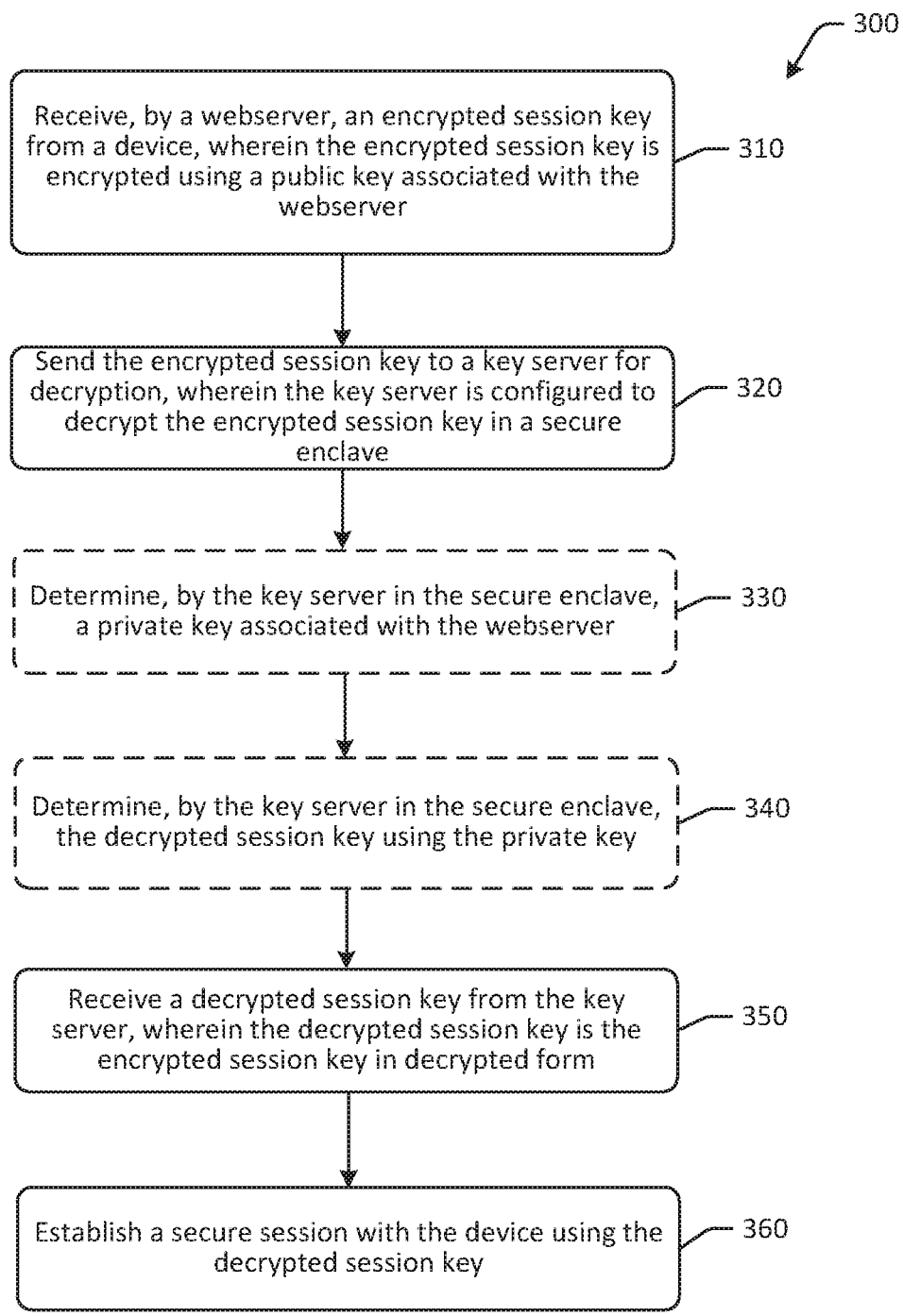
FIG. 3 is a schematic illustration of an example process flow for using secure enclaves for decryption in unsecured locations in accordance with one or more example embodiments of the disclosure.

FIG. 2 is a schematic illustration of an example data and operation flow 200 for using secure enclaves for decryption in unsecured locations in accordance with one or more example embodiments of the disclosure. While example embodiments of the disclosure may be described in the context of webservers, key servers, and decryption of session keys, it should be appreciated that the disclosure is more broadly applicable to any type of server device and decryption of any type of data. Some or all of the blocks of the process flows in this disclosure may be performed in a distributed manner across any number of devices. Some of the data flow or operations may be optional and may be performed in a different order. FIG. 3 may be an example data and operation flow during an authentication process, such as a TLS handshake. TLS may be a protocol that provides communications privacy and security between two applications or computers communicating over a network.

A TLS handshake may be a process by which a secure session is established between a client device 210 and a webserver 230. The webserver 230 may be in communication with a TLS key server 220 that is configured to decrypt certain data. The TLS key server 220 may include a secure enclave 222 and a key server client 224. The secure enclave 222 may be built and executed into a special protected memory region of the TLS key server 220, and may have a restricted entry and exit location. Enclave code and data inside the CPU perimeter may run in the clear, and enclave data written to disk is encrypted and may be checked for integrity. In some embodiments, the secure enclave 222 may have one or more dedicated computer processors for executing applications or processes. The key server client 224 may be configured to call or send requests to the secure enclave 222.

At a first operation 240, the client device 210 may send a TLS hello message to the webserver 230. The client device 210 may be any suitable client device or server that desires a secure session or connection with the webserver 230. The client device 210 may also send a random value (that may be specific to the client) and/or a set of supported cipher suites to the webserver 230. The set of supported cipher suites may be the set of encryption or decryption algorithms that are supported by the client device 210. The webserver 230 may receive the TLS hello message and the optional random value and set of supported cipher suites.

At a second operation 242, the webserver 230 may send a server hello message to the client device 210. The webserver 230 may sent a random value (that may be specific to the webserver) to the client device 210, as well as a public certificate associated with the webserver 230. The public certificate may be used by the client device 210 to authenticate the webserver 230. The public certificate may include a public key that is associated with the webserver 230. The webserver 230 may optionally request a public certificate associated with the client device 210.

At a third operation 244, the client device 210 may send an encrypted session key to the webserver 230. The encrypted session key may be a session key that is encrypted using the public key that is associated with the webserver 230. For example, the client device 210 may determine the public key using the public certificate associated with the webserver 230, and may encrypt the session key using the public key. The encrypted session key may be sent to the webserver 230 for decryption using a private key associated with the webserver 230.

At a fourth operation 246, the webserver 230 may send the encrypted session key to the key server client 224 of the TLS key server 220. The encrypted session key may be sent along with a public/private key identifier, or any other key identifier, to the key server client 224. In some embodiments, the key identifier may be sent as metadata associated with the encrypted session key.

At a fifth operation 248, the key server client 224 may send the encrypted session key and the public key identifier to the secure enclave 222. Decryption of the encrypted session key may be performed by an application that at least partially executes in the secure enclave 222. For example, one or more components executing in the secure enclave 222 may receive the encrypted session key and key identifier, and may decrypt the encrypted session key. In some embodiments, a decryption application or decryption module at the TLS key server 220 may include an untrusted portion that executes outside the secure enclave, and a trusted portion that executes inside the secured enclave.

At an optional sixth operation 250, the TLS key server 220 may perform decryption of the encrypted session key using the secure enclave 222. For example, the untrusted portion of the decryption application or decryption module at the TLS key server 220 may send a call or request to the trusted portion of the decryption application or decryption module. The call or request may represent a request to decrypt the encrypted session key that was received by the TLS key server 220. The call or request may be associated with the key identifier. The trusted portion of the decryption application or decryption module may execute a decryption process in the secure enclave to decrypt the session key. The TLS key server 220 may determine the decrypted form of the encrypted session key using the secure enclave. In some embodiments, the private keys used to decrypt encrypted data may be stored at the secure enclave.

At a seventh operation 252, the decrypted session key may be sent by the secure enclave 222 (or by an application executing within the secure enclave) to the key server client 224. For example, the untrusted portion of the decryption application may receive the decrypted session key from the trusted portion executing in the secure enclave, and may send the decrypted session key to the key server client 224.

At an eighth operation 254, the key server client 224 may send the decrypted session key to the webserver 230. The webserver 230 may use the decrypted session key to decrypt subsequent communication from the client device.

At a ninth operation 256, the webserver 230 may send a changecipherspec message to the client device 210. The changecipherspec message may indicate that the decrypted session key is to be used for subsequent hashing and/or encryption of data. As a result, a secure channel or secure session may be established, and the client device 210 and webserver 230 can securely communicate via encryption using the session key.

In the example of FIG. 2, the webserver 230 may be unable to access the private key data that is associated with the webserver 230, as the private key data may be stored at the TLS key server 220. Accordingly, unauthorized access to the webserver 230 (which may be at increased risk in unsecured physical locations) may not result in unauthorized access to private key data for the webserver 230. Accordingly, communications encrypted using the server public key may not be compromised. In addition, even malware infected key servers may be secured as the malware may be unable to access the secure enclave 222.

FIG. 3 depicts an example process flow 300 for using secure enclaves for decryption in unsecured locations in accordance with one or more example embodiments of the disclosure. While example embodiments of the disclosure may be described in the context of webservers, key servers, and decryption of session keys, it should be appreciated that the disclosure is more broadly applicable to any type of server device and decryption of any type of data. Some or all of the blocks of the process flows in this disclosure may be performed in a distributed manner across any number of devices. Some of the operations of the process flow 300 may be optional and may be performed in a different order.

At block 310 of the process flow 300, computer-executable instructions stored on a memory of a device, such as a webserver, may be executed to receive an encrypted session key from a device, wherein the encrypted session key is encrypted using a public key associated with the webserver. For example, the webserver may be associated with a public key and a private key. The public key may be used by devices, such as client device and/or other servers, to encrypt data, such as session keys, that is sent to the webserver. The private key may be used, sometimes in conjunction with the public key, to decrypt the data that is received by the webserver from other devices. Accordingly, the webserver may receive an encrypted session key from a device, such as a client device and/or a server, where the session key is encrypted using the public key that is associated with the webserver. In some instances, the webserver may send the public key to the device responsive to a request from the device, such as a request to initiate a secure session. For example, the webserver may send the public key to the device during a TLS handshake protocol. The device may therefore use the public key for encryption of a session key that is sent to the webserver.

In certain embodiments, the private key that is associated with the webserver may be unknown to or inaccessible by the webserver, and may instead be stored and/or known by a key server. As a result, illicit or unauthorized access to the webserver may not result in the private key associated with the webserver being compromised.

At block 320 of the process flow 300, computer-executable instructions stored on a memory of a device, such as the webserver, may be executed to send the encrypted session key to a key server for decryption, wherein the key server is configured to decrypt the encrypted session key in a secure enclave. For example, the webserver may be in communication with a key server. In some embodiments, the webserver and the key server may be executed on the same computer system or host. In such embodiments, the webserver and the key server may share computer resources, such as least one processor or memory device of the computer system or host. The webserver and the key server may be located in an unsecure physical environment, such as an environment without video monitoring, without fencing or caging, without lock and key, and/or without other physical security.

In other embodiments, the webserver may be physically separated from the key server. For example, the key server and the webserver may be executed on separate computer systems and/or hosts. The key server and the webserver may have separate computing resources. In such instances, the physical distance between the webserver and the key server may be limited (e.g., the webserver and the key server may be in the same facility, the same room, the same geographic region as defined by (in one example) zip code, etc.), so as to reduce latency in responses by the key server to calls or requests from the webserver, and by the webserver to calls or requests from the key server. In some instances, both the webserver and the key server may be located in an unsecure physical environment, such as an environment without video monitoring, without fencing or caging, without lock and key, and/or without other physical security.

The webserver may send the encrypted session key to the key server for decryption. The key server may be configured to decrypt the encrypted session key in a secure enclave. For example, the key server may receive the encrypted session key from the webserver. The key server may also receive a key identifier, such as a private key identifier, from the webserver. The private key identifier may be sent as metadata associated with the encrypted session key or as a separate communication. The private key identifier may be an identifier, such as a certificate identifier, device identifier, etc., that is associated with the webserver and/or the private key of the webserver. The private key identifier may be used by the key server to identify and/or determine the correct private key that is to be used to decrypt the encrypted session key. The key server may use the key identifier to identify a private key associated with the webserver, such as by querying one or more datastores and/or cache memory.

The key server may include a secure enclave that can be used to decrypt the session key. The secure enclave may be a protected region of memory at the key server that is prevented from access by an operating system and other software components of the key server. The secure enclave may be built or provisioned and executed into a special protected memory region of the memory of the key server, and may have a restricted entry and exit location. In some embodiments, the secure enclave may have one or more dedicated computer processors, such as a secure enclave processor, that is dedicated to processing for the secure enclave, such as for executing applications or processes.

At optional block 330 of the process flow 300, computer-executable instructions stored on a memory of a device, such as the key server, may be executed to determine, in the secure enclave, a private key associated with the webserver. For example, one or more modules, such as a decryption module and/or a decryption application at the key server may receive the encrypted session key and optionally the key identifier from the webserver. In some embodiments, the decryption application or decryption module may include an untrusted portion that executes outside the secure enclave, and a trusted portion that executes inside the secured enclave.

The untrusted portion of the decryption application or decryption module at the key server may send a call or request to the trusted portion of the decryption application or decryption module. The call or request may represent a request to decrypt the encrypted session key that was received by the key server. The call or request may be associated with the key identifier.

The trusted portion of the decryption application or decryption module may execute a decryption process in the secure enclave to decrypt the session key. For example, the process may include determining a private key associated with the webserver, and determining a decrypted form of, or decrypting, the encrypted session key using the private key. The private key may be determined using the key identifier, and may the private key may be associated with the key identifier in a datastore. In some embodiments, the datastore may be stored locally at the secure enclave portion of the memory of the key server. In other embodiments, some or all of the datastore may be stored at a different device or memory location. In some embodiments, the webserver may be a virtual host and may have more than one private key associated with the webserver. In such instances, a certain private key that is associated with the webserver may be identified using a private key identifier.

At optional block 340, computer-executable instructions stored on a memory of a device, such as the key server, may be executed to determine, in the secure enclave, the decrypted session key using the private key. For example, the decryption process executed by the trusted portion of the decryption application or decryption module may include determining a decrypted form of, or decrypting, the encrypted session key using the private key. After the encrypted session key is decrypted, the decrypted session key may be sent from the trusted portion of the decryption application or decryption module to the untrusted portion of the decryption application or decryption module. The untrusted portion of the decryption application or decryption module, as well as the operating system and other software components of the key server, may be unable to determine the actions that were executed in the secure enclave during the decryption process. The actions executed in the secure enclave may be hidden from other portions and software components of the key server.

At block 350, computer-executable instructions stored on a memory of a device, such as the webserver, may be executed to receive a decrypted session key from the key server, wherein the decrypted session key is the encrypted session key in decrypted form. For example, after the decryption process is complete in the secure enclave, the untrusted portion of the decryption application or decryption module at the key server may send the decrypted session key to the webserver. The webserver may receive the decrypted session key.

At block 360, computer-executable instructions stored on a memory of a device, such as the webserver, may be executed to establish a secure session with the device using the decrypted session key. For example, the webserver may send a secure session confirmation message to the device. In some embodiments, the webserver may send a "changecipherspec" message to the device to confirm an encryption algorithm for use during the secure session and/or to initiate the secure session. In some embodiments, the secure session confirmation message may indicate completion of an SSL or TLS handshake, and a secure SSL or TLS session may be established.

As a result, the webserver may be unable to access the private key data that is associated with the webserver. Accordingly, unauthorized access to the webserver (which may be at increased risk in unsecured physical locations) may not result in unauthorized access to private key data for the webserver. Accordingly, communications encrypted using the server public key may not be compromised. By implementing the method of FIG. 3, latency in handshake protocols may be reduced and/or limited, while maintaining security of private key data and limiting access by unauthorized entities. In addition, even malware infected key servers may be secured as the malware may be unable to access the secure enclave.

Figure 4:
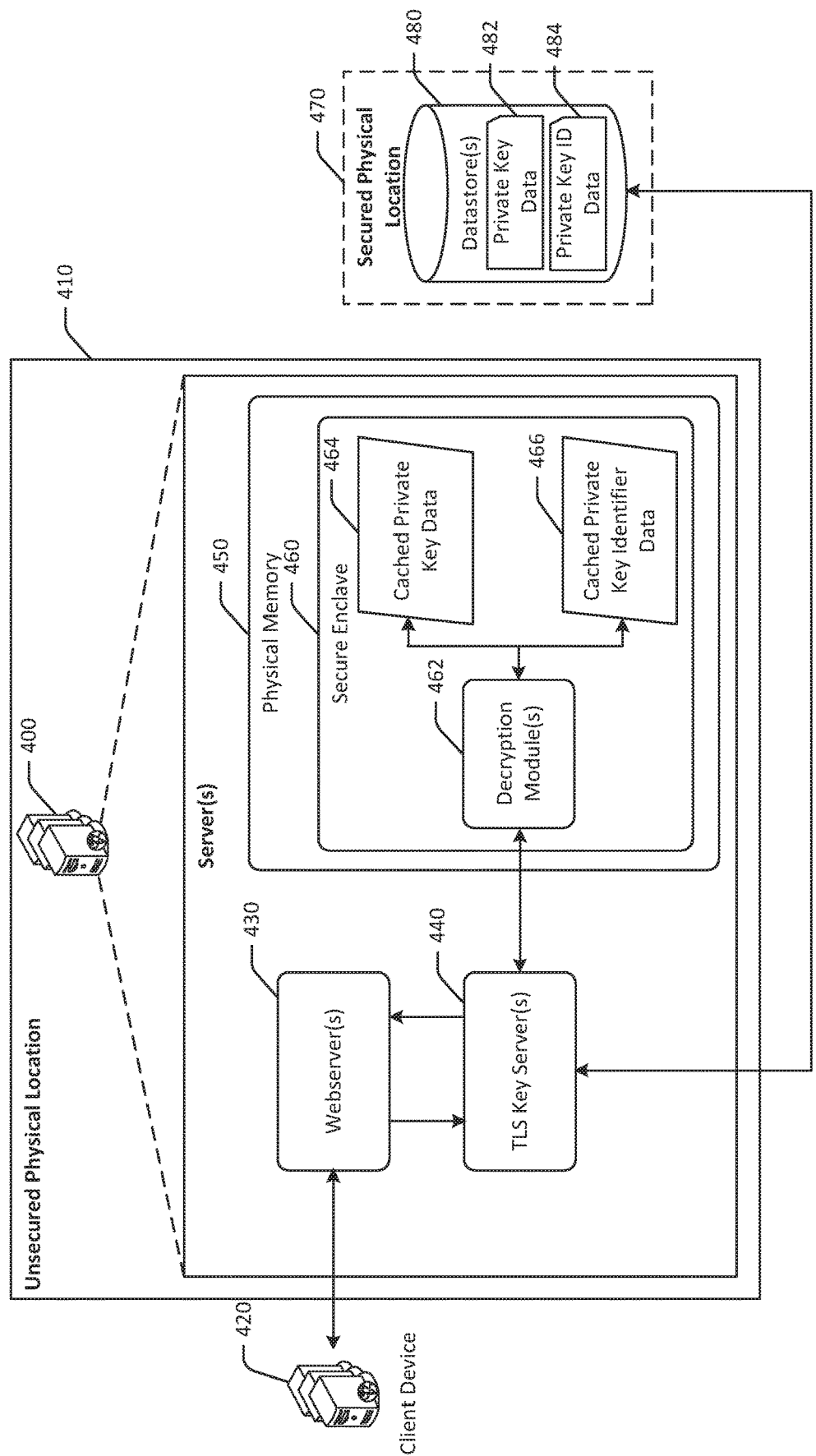
FIG. 4 is a schematic illustration of an example system with cache memory for using secure enclaves for decryption in unsecured locations in accordance with one or more example embodiments of the disclosure.

FIG. 4 is a schematic illustration of an example system with cache memory for using secure enclaves for decryption in unsecured locations in accordance with one or more example embodiments of the disclosure. The illustrated system is an example and other systems may include additional or fewer, or different, components. The system illustrated in FIG. 4 may be implemented, in one example, using cache memory for private key data for a certain number of webservers, and a separate secure datastore for private key data for other webservers. An example method of operation for the system of FIG. 4 is describes with respect to FIG. 5.

In FIG. 4, a server 400 may be located in an unsecured physical location 410. For example, the server 400 may not be in a designated webserver area, may not be under video surveillance, and/or may not be under physical lock and key (or other physical security implementation). The server 400 may be in communication with a client device 420. The client device 420 may initiate an authentication protocol, such as a TLS handshake, to establish a secure session with the server 400.

The server 400 illustrated in FIG. 4 may include one or more webservers 430 and one or more TLS key servers 440. The webserver 430 may be configured to serve files that form web pages or other content to the client device. The TLS key server 440 may be configured to authenticate a client device, such as by decryption a session key provided by the client device 420. The webserver 430 and the TLS key server 440 may share at least one computer processor of the server 400. In other embodiments, the webserver 430 and the TLS key server 440 may be physically separated from each other or stored at different servers.

The server 400 may include physical memory 450. The physical memory 450 may include any suitable memory that can be accessed by the webserver 430 and/or the TLS key server 440. The physical memory 450 may include a secure enclave 460, which may be a protected region of the physical memory 450, and may only be accessible by certain applications and/or components. For example, the operating system of the server 400 may be unable to access the secure enclave 460. The server 400 may provision the secure enclave 460 each time the server 400 and/or TLS key server 440 is rebooted.

The secure enclave 460 may include one or more decryption modules 462, cached private key data 464, and cached private key identifier data 466. The decryption module 462 may include an untrusted portion that executes outside the secure enclave 460, and a trusted portion that executes inside the secured enclave 460. The cached private key data 464 may include private key data for a number of webservers, such as webservers for which decryption operations are most frequently requested, webservers for which decryption operations were most recently requested, webservers that are associated with the highest traffic, and so forth. The cached private key identifier data 466 may include key identifiers associated with the respective private keys in the cached private key data. For example, a private key in the cached private key data 464 may be associated with a key identifier in the cached private key identifier data. The key identifier may be a fingerprint or a thumbprint associated with the private key. In some embodiments, the key identifier may be a hashed version of a private key.

The server 400 may be in communication with one or more datastores 480. For example, the TLS key server 440 may be in communication with the datastore 480. The datastore 480 may be optionally located in a secured physical location 470, such as a location that is under video surveillance, lock and key, cages, and/or the like. The datastore 480 may include private key data 482 for some or all private keys that are available to the server 400 (e.g., in addition to the private key data in the cached private key data 464), and private key identifier data 484 corresponding to the private key data 484.

Accordingly, if a private key needed to decrypt data, such as a session key, is unavailable in the cached private key data 464, the decryption module 462 may send a "key not found" or other error message to the TLS key server 440 in response to a request for decryption. The TLS key server 440 may receive the error message from the decryption module 462, and may fetch the private key from, and/or send a request for, the private key to the datastore 480. One or more modules at the datastore 480 may receive the request and may determine the private key. The private key may be sent in encrypted form to the TLS key server 440. For example, the private key may be encrypted using a public key that is associated with the secure enclave. The TLS key server 440 may receive the encrypted version of the requested private key from the datastore 480. The TLS key server 440 may send the encrypted version of the requested private key to the decryption module 462. The decryption module 462 may decrypt the encrypted private key using a private key associated with the secure enclave. The decryption module 462 may use the decrypted private key for decryption in the secure enclave 460. For example, the trusted portion of the decryption application or decryption module may execute a decryption process in the secure enclave 460 to decrypt the session key or other data.

The decryption module 462 may optionally store the private key in the cached private key data 464 and the corresponding key identifier in the cached private key identifier data 466 for subsequent use.

For instances where certificates and/or private keys are updated, certain rules or conditions may be applied. In a first instance, an updated certificate and/or private key may be received by the TLS key server 440 and server 400 prior to any subsequent decryption request. in such an instance, the same certificate and private key pair may be used, and the system may function normally. In a second instance, the updated certificate may be received by the TLS key server 440, and a request may be made for the updated certificate before the TLS key server 440 receives the updated private key. In such an instance, the certificate may not match the private key, and the TLS handshake may not be completed. In a third instance, the updated private key may be received by the TLS key server 440, and a request may be made for the private key before the server 400 receives the updated certificate. In such an instance, the certificate may not match the private key, and the TLS handshake may not be completed.

Figure 5:
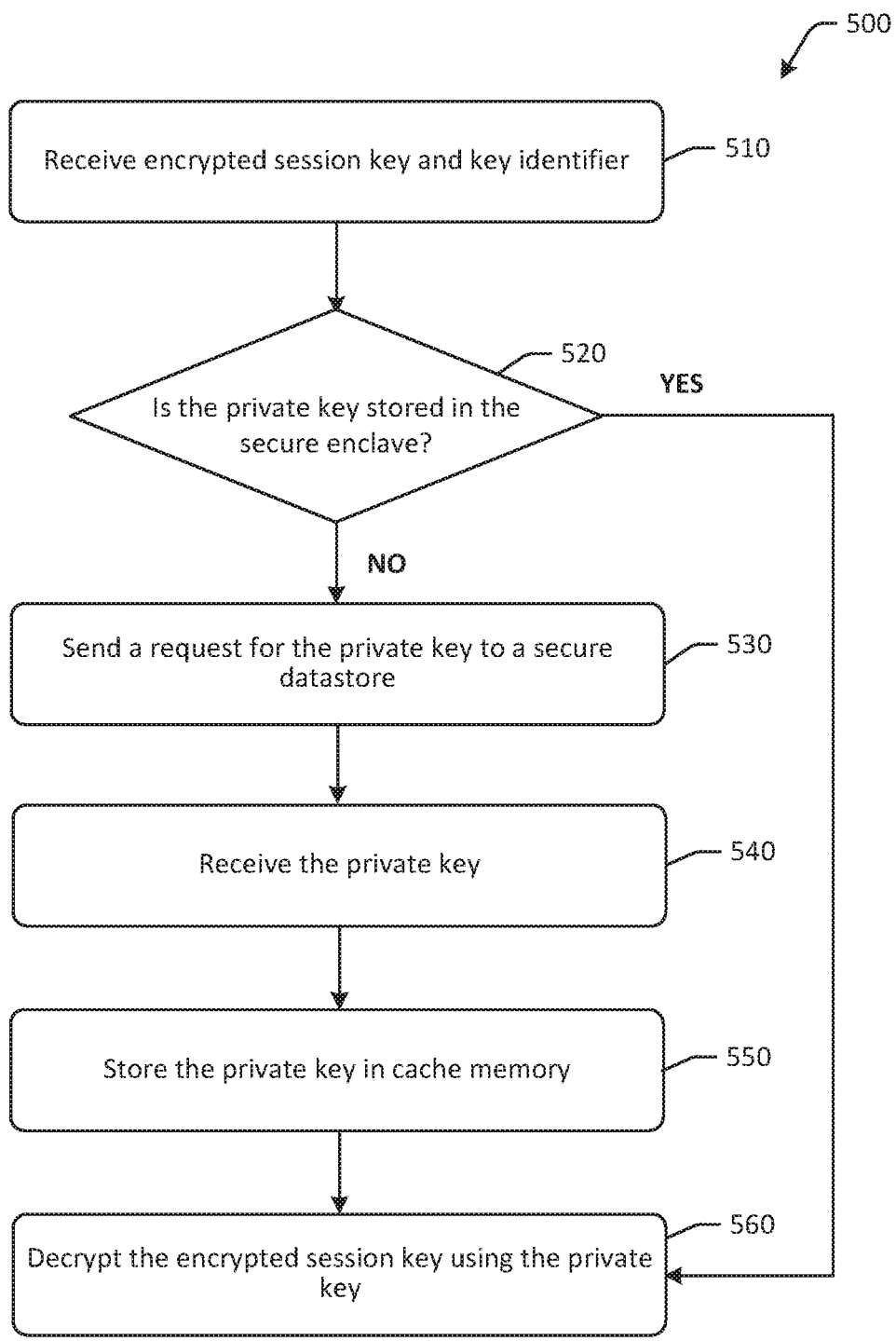
FIG. 5 is a schematic illustration of an example process flow for using secure enclaves with cache memory for decryption in unsecured locations in accordance with one or more example embodiments of the disclosure.

FIG. 5 depicts an example process flow 500 for using secure enclaves with cache memory for decryption in unsecured locations in accordance with one or more example embodiments of the disclosure. While example embodiments of the disclosure may be described in the context of webservers, key servers, cache memory, and decryption of session keys, it should be appreciated that the disclosure is more broadly applicable to any type of server device or memory and decryption of any type of data. Some or all of the blocks of the process flows in this disclosure may be performed in a distributed manner across any number of devices. Some of the operations of the process flow 500 may be optional and may be performed in a different order.

In some embodiments, private key data may be stored locally in a secure enclave at a key server. In other embodiments, private key data for some webservers may be stored locally in a secure enclave at a key server in cache memory, while other private key data for other webservers may be stored at a remote or local secure datastore. For example, private key data for relatively more popular webservers (e.g., as determined by frequency of decryption using the respective private keys, etc.) may be stored locally in cache memory, while private key data for relatively less popular webservers may be stored at a local datastore or a remote datastore. In such instances, in one example, if a private key for a relatively less popular webserver is needed for decryption, the key server may implement the process flow 500.

At block 510 of the process flow 500, computer-executable instructions stored on a memory of a device, such as a key server, may be executed to receive an encrypted session key and key identifier. For example, a key server may receive, from a webserver, an encrypted session key, as well as a key identifier. The encrypted session key may have been received by the webserver from a client device during an authentication handshake, in one example. In some embodiments, the encrypted session key and key identifier may be received by an untrusted portion of an application at the key server, and may be sent to a trusted portion of the application at the key server, where the trusted portion is executed in a secure enclave.

At determination block 520, computer-executable instructions stored on a memory of a device, such as a key server, may be executed to determine whether the private key associated with the key identifier is stored in the secure enclave. The private key may be used for decrypting the encrypted session key. In some embodiments, the determination at block 520 may be made by an untrusted portion of an application at the key server (e.g., by making a call to the trusted portion of the application, etc.), while in other embodiments, the determination at block 520 may be made by a trusted portion of the application at the key server that is executed in a secure enclave. For example, a query may be made as to whether the private key corresponding to the key identifier is stored in the secure enclave. The trusted portion of the application may generate a response indicating whether or not the private key is stored in the trusted enclave. If it is determined at determination block 520 that the private key is stored in the secure enclave, the process flow 500 may proceed to block 560.

If it is determined at determination block 520 that the private key is not stored in the secure enclave, the process flow 500 may proceed to block 530, at which the key server may send a request for the private key to a secure datastore. For example, the key server may determine that the private key associated with the key identifier and/or otherwise needed to decrypt the session key is not stored at the secure enclave (e.g., by receiving an error message from the decryption application, etc.), and may send a request for the private key to a secure datastore. The secure datastore may be a datastore resident in a different secure enclave, at a different memory device, and/or at a different secured computing system, such as a computing system in a secured physical location. In some embodiments, the key server may determine, in the secure enclave, that a private key associated with the webserver and/or key identifier is unavailable in cache memory, and may send a request for the private key to a secure database.

At block 540, computer-executable instructions stored on a memory of a device, such as a key server, may be executed to receive the private key. For example, responsive to the request for the private key, a computing system associated with the datastore may send the private key to the key server. The key server may receive the private key. The private key may be in an encrypted format, such as encryption using a public key associated with the secure enclave. The key server may send the encrypted private key to the secure enclave and/or the decryption application. The decryption application may be configured to decrypt the private key after receipt using, for example, a private key associated with the secure enclave. In some embodiments, the private key may be decrypted in the secure enclave.

At block 550, computer-executable instructions stored on a memory of a device, such as a key server, may be executed to store the private key in cache memory. For example, after the private key is received and/or decrypted by the key server (e.g., in the untrusted portion of the decryption application, etc.), the private key may be stored in cache memory. The cache memory may be in the secure enclave. This may allow for subsequent use of the private key in the secure enclave without having to request the private key from the datastores. After storing the private key in cache memory, the process flow 500 may proceed to block 560.

At block 560, computer-executable instructions stored on a memory of a device, such as a key server, may be executed to decrypt the encrypted session key using the private key. For example, the key server may determine, in the secure enclave, a decrypted session key using the private key. The trusted portion of a decryption application, which may be the portion of the decryption application executing in the secure enclave, may be used to execute a process to decrypt the encrypted session key. The decrypted session key may be sent to the webserver. The process flow 500 may therefore allow for reduced memory consumption by the secure enclave, as certain private keys may be stored at a datastore as opposed to in cache memory.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
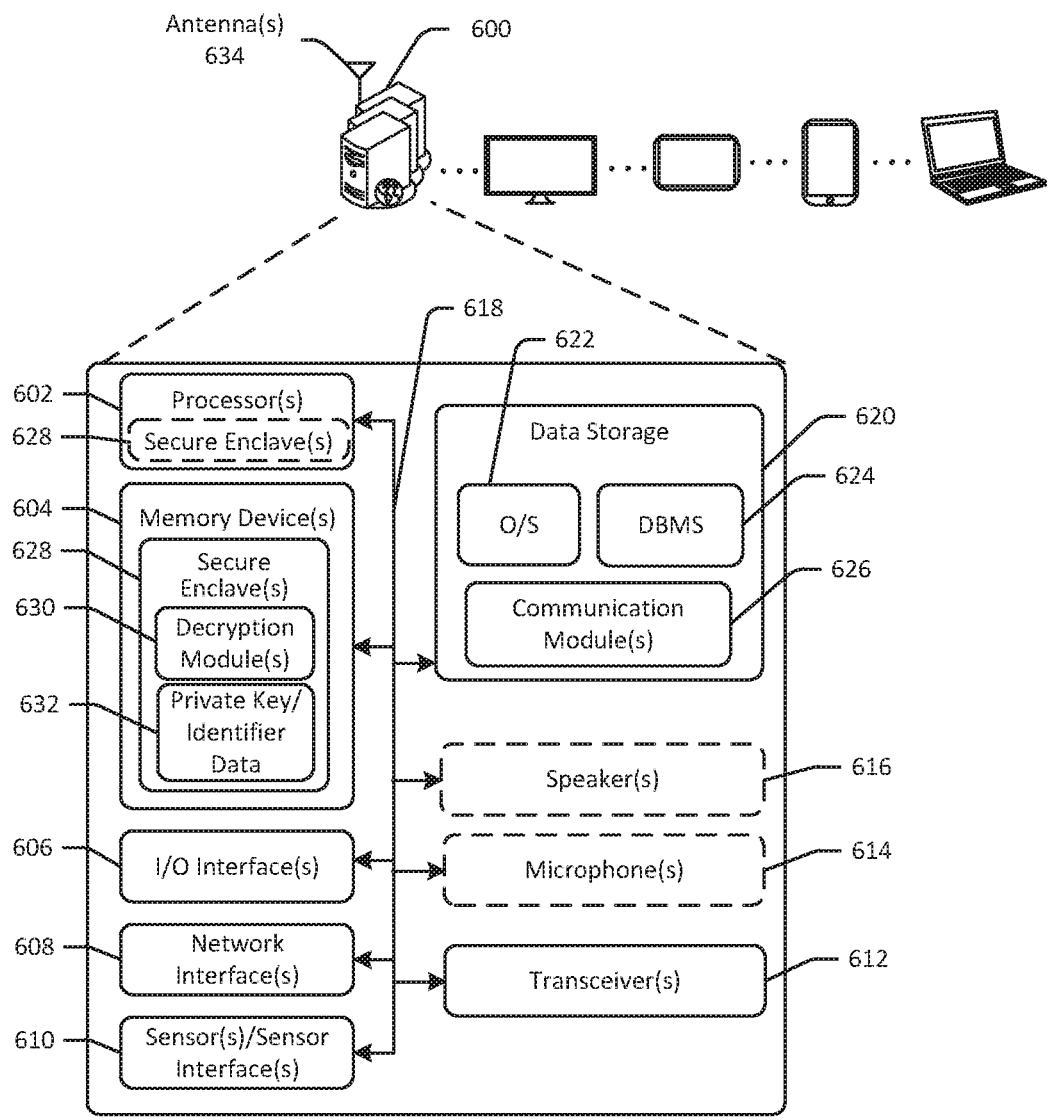
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The remote server 600 may correspond to an illustrative device configuration for the servers of FIGS. 1-5.

The remote server 600 may be configured to communicate via one or more networks with one or more servers, search engines, user devices, or the like. In some embodiments, a single remote server or single group of remote servers may be configured to perform more than one type of decryption functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more physical memory or memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The remote server 600 may further include one or more buses 618 that functionally couple various components of the remote server 600. The remote server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The memory 604 may include one or more secure enclaves 628. The secure enclave(s) 628 may be built and executed into a special protected memory region of the memory 604, and may have a restricted entry and exit location. Enclave code and data inside the CPU perimeter may run inside the enclave, and enclave data written to disk is encrypted and may be checked for integrity. In some embodiments, the secure enclave(s) 628 may have one or more dedicated computer processors for executing applications or processes. For example, as illustrated in FIG. 6, the secure enclave 628 may optionally be executed by a protected portion of the processors 602 and/or may have one or more dedicated computer processors 602.

One or more software components, such as one or more decryption module(s) 630, may be executable in the secure enclave 628. The decryption module(s) 630 may be built and executed within the enclave, so as to prevent data leakage. Calls or requests may be received by the decryption module(s) 630, and the decryption module(s) 630 may determine a response to the requests within the secure enclave(s) 628, and output a response. For example, the decryption module(s) 630 may be configured to receive a request to decrypt a message, and, within the secure enclave(s) 628, determine a private key for the decryption, decrypt the message, and return a decrypted result. As a result of the secure enclave(s) 628 environment, other software components, such as the operating system 622 may be unable to monitor actions or processes executing within the secure enclave(s) 628. The secure enclave(s) 628 may be hidden from access from other components of the server 600.

Certain data may be stored on the portion of the memory 604 dedicated to the secure enclave 628. For example, private key/identifier data 632 may be stored on the portion of the memory 604 dedicated to the secure enclave 628. The private key/identifier data 632 may therefore not be accessible other than by applications or components executing within the secure enclave 628. The private key/identifier data 632 may include one or more private keys, which may optionally be associated with metadata, such as key identifiers. The private key/identifier data 632 may be used to encrypt or decrypt content.

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more communication module(s) 626. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, digital certificate data, session record data, user account information, user profile information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers, communicating with remote datastores, sending or receiving messages, communicating with cache memory data, and the like.

Referring now to other illustrative components depicted as being stored in the data storage 620, the O/S 622 may be loaded from the data storage 620 into the memory 604 and may provide an interface between other application software executing on the remote server 600 and hardware resources of the remote server 600. More specifically, the O/S 622 may include a set of computer-executable instructions for managing hardware resources of the remote server 600 and for providing common services to other application programs (e.g., managing memory allocation among various application programs). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna(e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed or licensed portions of the radio spectrum.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A method comprising:
   receiving, by a webserver in an unsecured physical location from a client device, a client hello message indicative of a request to initiate a secure session using Transport Layer Security (TLS), the client hello message comprising a first random value and a set of key exchange encryption algorithms supported by the client device;
   sending, by the webserver to the client device, (i) a server hello message comprising a second random value, and (ii) a server digital certificate for authentication of the webserver by the client device, wherein the server digital certificate comprises a server public key;
   receiving, by the webserver from the client device, an encrypted session key for the secure session, wherein the encrypted session key is encrypted using the server public key;
   sending, by the webserver to a key server that is physically separated from the webserver, the encrypted session key and a key identifier associated with the server public key for decryption by the key server;
   sending, by the key server to a decryption application executing on a secure enclave at the key server, the encrypted session key and the key identifier for decryption, wherein the secure enclave is configured to operate in a protected area of execution in memory of the key server, and wherein the secure enclave is inaccessible by an operating system of the key server, and wherein the decryption application decrypts the encrypted session key by:
     transitioning execution from an untrusted portion of the decryption application to the secure enclave;
     determining, by the key server, that an encrypted private key associated with the webserver is unavailable in secure cache memory;
     sending, by the key server, a request for the encrypted private key to an external secure datastore that is in communication with the key server;
     receiving, by the key server, the encrypted private key from the secure datastore, wherein the encrypted private key is encrypted using a public key associated with the secure enclave;
     and
     determining the decrypted session key using a trusted decryption function and the encrypted private key;
   receiving, by the key server from the decryption application, a decrypted session key;
   sending, by the key server to the webserver, the decrypted session key, wherein the decrypted session key is used for encryption and decryption of communication between the webserver and the client device; and
   sending, by the webserver to the client device, a confirmation message indicating that the decrypted session key will be used for subsequent communication.

2. The method of claim 1, wherein the decryption application comprises a call gate that restricts entry to and exit from the decryption application.

3. The method of claim 1, further comprising:
   encrypting a private key associated with the key identifier using a secure enclave public key; and
   sending the private key that is encrypted using the secure enclave public key for storage in the secure enclave.

4. A method comprising:
   receiving, by one or more computer processors coupled to memory of a webserver, an encrypted session key from a device, wherein the encrypted session key is encrypted using a public key associated with the webserver;

sending the encrypted session key to a key server for decryption, wherein the key server is configured to decrypt the encrypted session key in a secure enclave by:
  transitioning execution from an untrusted portion of a decryption application to the secure enclave;
  determining, by the key server, that an encrypted private key associated with the webserver is unavailable in secure cache memory;
  sending, by the key server, a request for the private key to an external secure datastore that is in communication with the key server; and
  determining a decrypted session key using the encrypted private key and a trusted decryption function, wherein private key data for a plurality of private keys is stored at the secure enclave;
receiving a decrypted session key from the key server, wherein the decrypted session key is the encrypted session key in decrypted form; and
establishing a secure session with the device using the decrypted session key.

5. The method of claim 4, wherein the secure enclave comprises a protected region of memory and processor at the key server that is prevented from access by an operating system of the key server.

6. The method of claim 4, further comprising:
sending a key identifier to the key server, wherein the key server uses the key identifier to identify the private key associated with the webserver.

7. The method of claim 4, further comprising:
determining, by the key server in the secure enclave, the private key associated with the webserver.

8. The method of claim 4, further comprising:
encrypting the private key using a secure enclave public key; and
sending the private key that is encrypted using the secure enclave public key to the key server for storage in the secure enclave.

9. The method of claim 4, further comprising:
receiving a request from the device to initiate the secure session;
sending the public key to the device; and
sending a secure session confirmation message to the device.

10. The method of claim 4, wherein the webserver is positioned in a physically unsecured location, and wherein the webserver is prevented from accessing the private key that is associated with the webserver.

11. The method of claim 4, wherein the webserver and key server share at least one computer processor.

12. The method of claim 4, wherein the webserver and the key server are physically separated from each other.

13. A system comprising:
a webserver; and
a key server comprising memory that stores computer-executable instructions and at least one processor configured to access the memory and execute the computer-executable instructions to:
receive a request from the webserver to decrypt an encrypted session key, the request comprising a key identifier;
transition execution from an untrusted portion of a decryption application to a secure enclave at the key server, wherein the decryption application is configured to be executed in the secure enclave to decrypt the encrypted session key;
determine that an encrypted private key associated with the webserver is not stored in the memory;
send a request for the encrypted private key to an external secure datastore that is in communication with the key server;
determine the encrypted private key associated with the key identifier;
determine, in the secure enclave, a decrypted session key using the encrypted private key and a trusted decryption function, wherein the encrypted private key is encrypted using a public key associated with the secure enclave; and
send the decrypted session key to the webserver, wherein the decrypted session key is the encrypted session key in decrypted form;
wherein the webserver is configured to establish a secure session with a device using the decrypted session key.

14. The system of claim 13, wherein the at least one processor is further configured to access the memory and execute the computer-executable instructions to:
provision the secure enclave after the key server is rebooted.

15. The system of claim 13, wherein the webserver and the key server are physically separated in an unsecure physical location.

16. The system of claim 13, wherein the webserver and the key server share the at least one processor in an unsecure physical location.

17. The system of claim 13, wherein the key server further comprises a secure enclave processor that is dedicated to processing for the secure enclave, and wherein the secure enclave executes in a protected region of the memory that is prevented from access by an operating system of the key server.

* * * * *